(12) United States Patent
Tsukidate et al.

(10) Patent No.: US 7,299,275 B2
(45) Date of Patent: Nov. 20, 2007

(54) CONTENT DELIVERY SYSTEM FOR DYNAMICALLY AND OPTIMALLY RELOCATES CONTENTS TO ARCHIVE SERVER, EDGE SERVERS AND TERMINAL STORAGE DEVICES BASED ON USERS' VIEWING TENDENCY

(75) Inventors: Ryota Tsukidate, Kawasaki (JP); Hirohito Kitatora, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 933 days.

(21) Appl. No.: 10/453,922

(22) Filed: Jun. 3, 2003

(65) Prior Publication Data
US 2004/0064832 A1  Apr. 1, 2004

(30) Foreign Application Priority Data
Jun. 3, 2002  (JP)  ............................. P2002-161096

(51) Int. Cl.
G06F 15/173  (2006.01)
(52) U.S. Cl. ........................ 709/223; 709/218; 718/105
(58) Field of Classification Search ................ 709/219, 709/225, 226, 239, 240, 223, 217, 231, 218; 705/14; 707/3, 1; 345/173; 718/105
See application file for complete search history.

(56) References Cited

U.S. PATENT DOCUMENTS

| | | | |
|---|---|---|---|
| 6,751,673 B2* | 6/2004 | Shaw .......................... 709/231 |
| 7,010,578 B1* | 3/2006 | Lewin et al. ................ 709/217 |
| 7,111,057 B1* | 9/2006 | Sherman et al. ............ 709/223 |
| 2002/0152121 A1* | 10/2002 | Hiroshi ........................ 705/14 |
| 2003/0061206 A1* | 3/2003 | Qian ............................. 707/3 |
| 2003/0122792 A1* | 7/2003 | Yamamoto et al. ......... 345/173 |
| 2003/0187984 A1* | 10/2003 | Banavar et al. ............. 709/225 |
| 2003/0225723 A1* | 12/2003 | Agarwalla et al. ............. 707/1 |

* cited by examiner

Primary Examiner—Le Hien Luu
(74) Attorney, Agent, or Firm—Browdy and Neimark, PLLC

(57) ABSTRACT

The present invention achieves maintenance of service quality and efficient operation of a system by dynamically and optimally relocating contents in each of an archive server, edge servers, and terminal storage devices. To achieve the object, the present invention provides a contents delivery system in which a CDN (contents delivery network) having plural edge servers intervenes between a center device managing an archive server storing contents and user terminals having large-capacity storage devices, wherein the center device includes: a viewing results collection part; a viewing results analysis part; a contents allocation part for relocating contents to each of the archive server, relay servers, and user terminals, based on an analyzed viewing tendency; a portal creation part for automatically creating a portal after the relocation; and a price decision part for automatically deciding contents prices after the relocation.

22 Claims, 18 Drawing Sheets

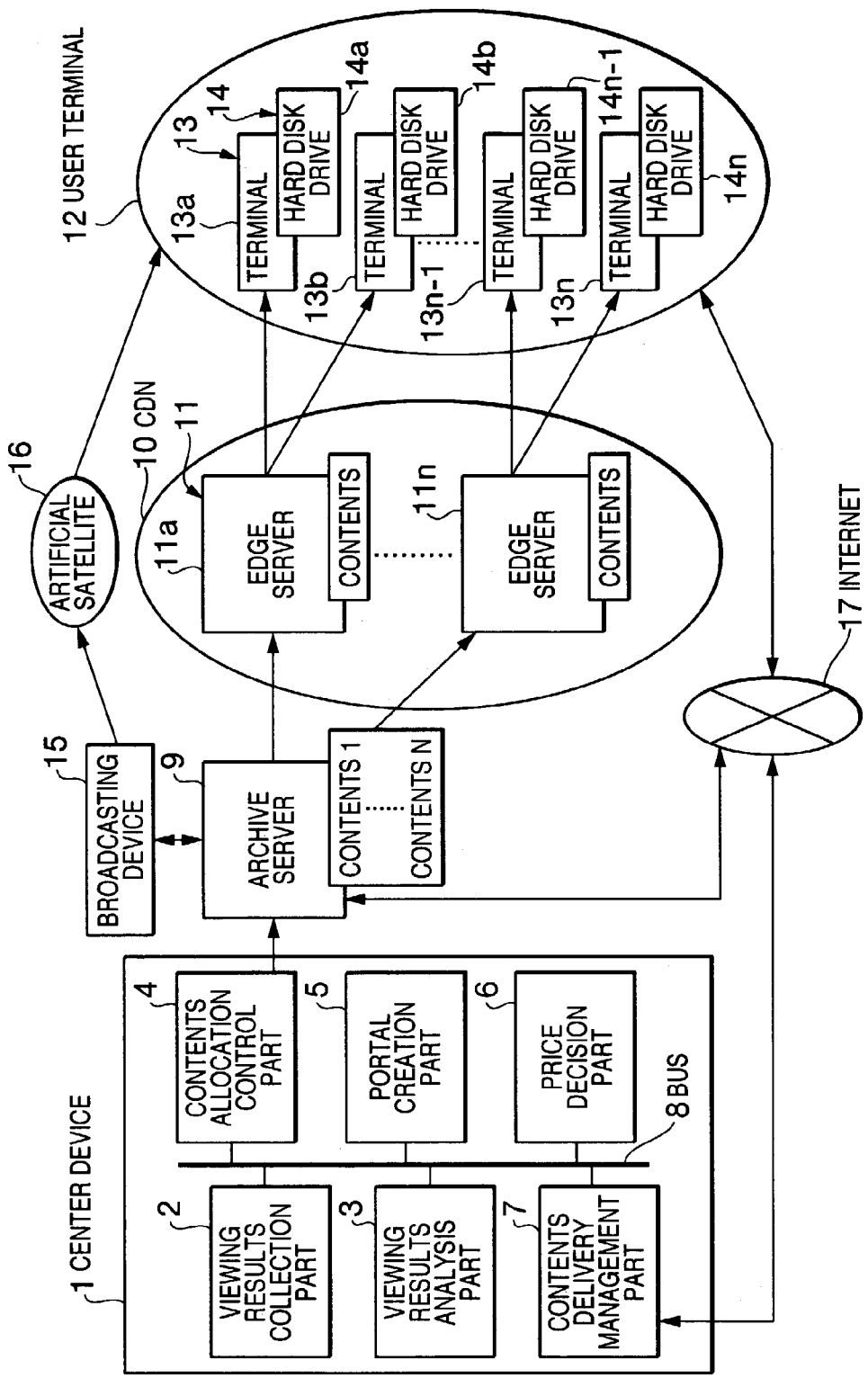

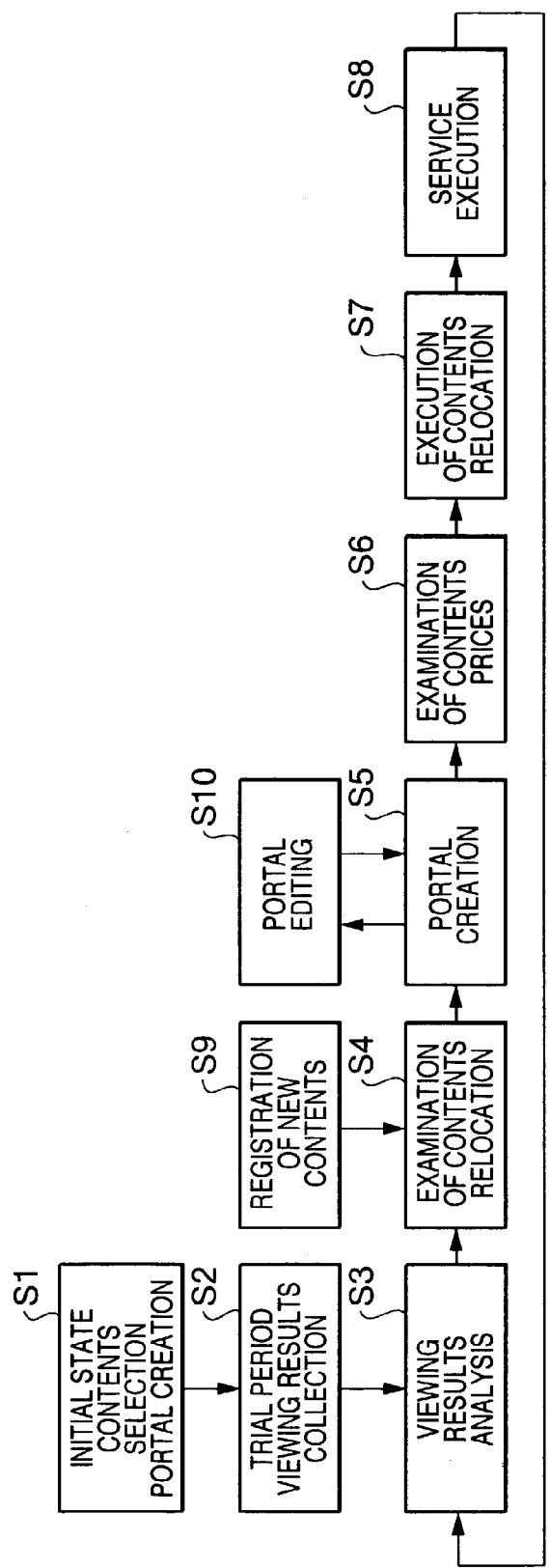

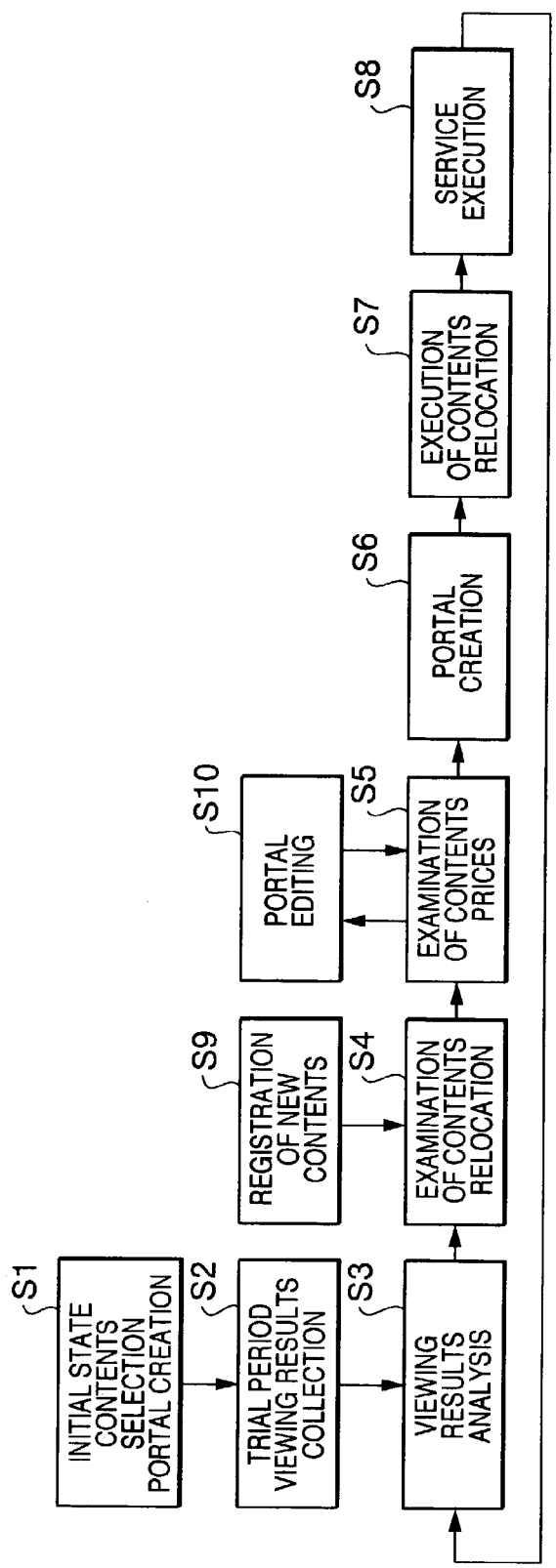

FIG. 4

| | |
|---|---|
| MANAGEMENT ID | |
| TITLE | |
| RUNNING TIME | |
| GENRE | |
| SUMMARY | |
| PERFORMER | |
| VIEWING LIMITATION LEVEL (R-RATED, ETC.) | |
| STORAGE LEVEL | |
| URL ※ | |
| DATA STORAGE LOCATION WITHIN SERVER | |
| ENCODING | VIDEO ENCODING SYSTEM |
| | bitrate |
| | VOICE ENCODING SYSTEM |
| | bitrate |
| | TOTAL DATA AMOUNT |
| PRICE | NUMBER OF PRICE VARIATIONS |
| | PRICE 1 : TIME ZONE |
| | ⋮ |
| | PRICE n : TIME ZONE |
| ATTRIBUTE | PRICE CHANGED |
| | ⋮ |
| | RECOMMENDED TARGET |
| VALID PERIOD | START DATE |
| | END DATE |
| PORTAL DISPLAY LOCATION | |
| ACCESS RANKING | |
| ACCESS COUNT | |

※ URL, WHEN SHOWN TO A USER, SPECIFIES AN EDGE SERVER CLOSEST TO THE USER (EXISTING CDN TECHNOLOGY).

FIG.5
(a)

| STORAGE LEVEL | URL |
|---|---|
| 0 | http://arohive.cinemahighway.com |
| 1 | http://1.edge 1.cinemahighway.com |
| | ⋮ |
| | http://5.edge 1.cinemahighway.com |
| 2 | http://1.edge 2.cinemahighway.com |
| | ⋮ |
| | http://100.edge 2.cinemahighway.com |
| ⋮ | |
| n | http://1.edge n.cinemahighway.com |
| | ⋮ |
| | http://m.edge n.cinemahighway.com |

FIG.5
(b)

| STORAGE LEVEL | SHELF DROPOUT THRESHOLD VALUE | PRICE REDUCTION THRESHOLD VALUE |
|---|---|---|
| 1 | 10 | – |
| 2 | 100 | 50 |
| ⋮ | ⋮ | ⋮ |
| n | 10000 | 5000 |
| n+1 | 100000 | 50000 |

FIG.6
(a)

| VIEWING LIMITATION INDICATION |
|---|
| VIEWING LIMITATION LEVEL |
| VIEWING LIMITATION CANCEL PASSWORD |
| VIEWING HISTORY DISPLAY INDICATION |
| LINE SPEED (BPS) |

FIG.6
(b)

| MANAGEMENT ID | TITLE | URL | VIEWING DATE |
|---|---|---|---|

FIG.11

| 21 ADDITIONAL INFORMATION | 22 TITLE | 23 RUNNING TIME | 24 SERVICE TYPE | 25 | 26 |
|---|---|---|---|---|---|
| New! | title1 | 120 MIN | HDD | DETAIL | VIEW |
| RECOMMEND | title2 | 110 MIN | HDD | DETAIL | VIEW |
| Discount! | title3 | 125 MIN | HDD | DETAIL | VIEW |
| Time Sale! | title4 | 120 MIN | Stream | DETAIL | VIEW |
| SOON CLOSED | title5 | 121 MIN | Stream | DETAIL | VIEW |
| RECOMMEND | title6 | 120 MIN | Stream | DETAIL | VIEW |
| Discount! | title7 | 120 MIN | Download 480 MIN | DETAIL | VIEW |
| New! | title8 | 135 MIN | Download 540 MIN | DETAIL | VIEW |

FIG.14 (a)

| | TITLE | RUNNING TIME | SERVICE TYPE | | |
|---|---|---|---|---|---|
| New! | title1 | 120 MIN | HDD | DETAIL | VIEW |
| RECOMMEND | title2 | 110 MIN | HDD | DETAIL | VIEW |
| Discount! | title3 | 125 MIN | HDD | DETAIL | VIEW |
| Time Sale! | title4 | 120 MIN | Stream | DETAIL | VIEW |
| SOON CLOSED | title5 | 121 MIN | Stream | DETAIL | VIEW |
| RECOMMEND | title6 | 120 MIN | Stream | DETAIL | VIEW |
| Discount! | title7 | 120 MIN | Download 480 MIN | DETAIL | VIEW |
| New! | title8 | 135 MIN | Download 540 MIN | DETAIL | VIEW |

FIG.14 (b)

| | TITLE | RUNNING TIME | SERVICE TYPE | | |
|---|---|---|---|---|---|
| New! | title1 | 120 MIN | HDD | DETAIL | VIEW |
| RECOMMEND | title2 | 110 MIN | HDD | DETAIL | VIEW |
| Discount! | title3 | 125 MIN | HDD | DETAIL | VIEW |
| Discount! | title7 | 120 MIN | Download 960 MIN | DETAIL | VIEW |
| New! | title8 | 135 MIN | Download 1080 MIN | DETAIL | VIEW |
| RECOMMEND | title9 | 120 MIN | Download 960 MIN | DETAIL | VIEW |
| Discount! | title10 | 120 MIN | Download 960 MIN | DETAIL | VIEW |
| New! | title11 | 120 MIN | Download 960 MIN | DETAIL | VIEW |

CONTENT DELIVERY SYSTEM FOR DYNAMICALLY AND OPTIMALLY RELOCATES CONTENTS TO ARCHIVE SERVER, EDGE SERVERS AND TERMINAL STORAGE DEVICES BASED ON USERS' VIEWING TENDENCY

BACKGROUND OF THE INVENTION

1. Field of the Invention

The present invention relates to a contents delivery system and a contents delivery method for delivering large-capacity contents upon users' requests.

2. Description of the Prior Art

Conventionally, to deliver large-capacity contents such as movies to user terminals, CDN (Contents Delivery Network) has intervened between an archive server storing contents in large quantity and the user terminals because only use of the Internet is insufficient. The CDN is a network in which edge servers serving as relay servers located in respective regions are connected, wherein the edge servers are stored with a large number of contents probably favorite to users. Thereby, by accessing the edge servers without directly accessing the archive server, the users can view favorite contents in a relatively short time in the form of streaming or by downloading them. On the other hand, a technology for automatically delivering contents has been developed. According to the technology, large-capacity storage devices such as hard disk drives are connected to user terminals, and according to contracts with a system administrator, desired contents are automatically delivered directly to the hard disk drives within homes from an archive server through an artificial satellite or the Internet. Therefore, according to such a satellite delivery system, the users can view desired contents at favorite times.

However, in the case of a contents delivery system in which edge servers intervene between an archive server and user terminals, although the edge servers store relatively popular contents, they may not match actual users' preferences, in which case the users may directly access the archive server through the Internet. Repeated occurrence of such a situation would increase the load on the archive server and the Internet, make it difficult to maintain a given service quality, and lose opportunities to provide services for customers, damaging reliability for the system. Also, since the edge servers installed at very high cost are not effectively used, the withdrawal of invested costs may become slow.

SUMMARY OF THE INVENTION

The present invention solves the above-described problems, and an object of the present invention is to provide a contents delivery system and a contents delivery method that can achieve the maintenance of service quality and the efficient operation of a system by dynamically and optimally relocating contents in each of an archive server, edge servers, and terminal storage devices.

To achieve the above-described object, the present invention is a contents delivery system in which a contents delivery network having plural relay servers intervenes between a center device managing an archive server storing contents and user terminals having large-capacity storage devices, wherein the center device comprises: a viewing results collection part for collecting viewing results from the user terminals; a viewing results analysis part for analyzing a viewing tendency from the collected viewing results; a contents allocation control part for relocating, based on the analyzed viewing tendency, contents to each of the archive server, the relay servers, and the storage devices; and a contents delivery management part having a contents management table. With this construction, contents in the archive server, relay servers, and terminal storage devices can be dynamically and optimally relocated, and the maintenance of service quality and the efficient 0operation of the system can be achieved. Since users' preferences in relay servers in each region rather than general users' preferences can be reflected, contents can be delivered with local colors taken into consideration.

The contents delivery system of the present invention includes a portal creation part, when the contents have been relocated, for automatically creating portal contents reflecting the relocated contents. With this construction, since portal contents displayed in the user terminals reflect relocated contents, new contents can be easily accessed. The users can be prompted to access contents desired to view.

The contents delivery system of the present invention is characterized in that portal display location data indicating a display location within the portal contents is contained in the contents management table. This construction allows new portal contents to be automatically created.

The contents delivery system of the present invention is characterized in that additional information for the contents is appended to the portal contents. This construction contributes to guiding the users in accessing.

The contents delivery system of the present invention is characterized in that the additional information is a mark for attracting users' interest. This construction contributes to the promotion of contents viewing.

The contents delivery system of the present invention is characterized in that the additional information is a viewing end mark capable of selecting whether to make display or not. With this construction, the additional information can be used in place of users' memos and privacy can be held.

The contents delivery system of the present invention includes a price decision part for changing contents prices according to the collected viewing results. With this construction, by reducing the prices of unpopular contents to promote access to them, the distribution of contents can be promoted.

The contents delivery system of the present invention changes the prices according to time zones. With this construction, by reducing charges only in idle time zones, the use of contents can be promoted.

The contents delivery system of the present invention is characterized in that, if the prices are changed, the changed prices are recorded in the contents management table. With this construction, a relationship between changes in contents prices and viewing results can be recognized.

The contents delivery system of the present invention is characterized in that: the relay servers respectively group one or more relay servers to plural relay server groups; each of the relay server groups is disposed between the archive server and the user terminals so that the user terminals can directly access relay servers within each of the relay server groups; a number of relay servers within the relay server group increases successively toward a downstream side in which the user terminals are disposed; more contents having high viewing results are accommodated in relay servers in the downstream side; and contents most likely to be viewed are accommodated in the user terminals. With this construction, contents for the relay servers can be optimally relocated, and contents can be more flexibly delivered.

The contents delivery system of the present invention delivers contents from the archive server to the user terminals with automatic storage updating via a satellite. With this construction, the users can automatically store high-quality contents having the highest access frequency without storing the contents by themselves.

The contents delivery system of the present invention is characterized in that delivers contents from the archive server to the user terminals with automatic storage updating via the Internet. With this construction, the users can automatically store contents having the highest access frequency without storing the contents by themselves.

The present invention is a contents delivery method in a contents delivery system in which a contents delivery network having plural relay servers intervenes between a center device managing an archive server storing contents and user terminals having large-capacity storage devices, wherein processing of the center device includes the steps of: collecting viewing results from the user terminals; analyzing a viewing tendency from the collected viewing results; and relocating, based on the analyzed viewing tendency, contents to each of the archive server, the relay servers, and the storage devices. By this method, contents in each of the archive server, the relay servers, and the terminal storage devices can be dynamically and optimally relocated, and the maintenance of service quality and the efficient operation of the system can be achieved. Since users' preferences in relay servers in each region rather than general users' preferences can be reflected, contents can be delivered with local colors in mind.

The contents delivery method of the present invention includes the step of automatically creating, when the contents have been relocated, portal contents reflecting relocated contents. By this method, since portal contents displayed in the user terminals reflect relocated contents, new contents can be easily accessed.

The contents delivery method of the present invention includes the step of changing the contents prices according to the collected viewing results. By this method, by reducing the prices of unpopular contents to promote access to them, the distribution of contents can be promoted.

The contents delivery method of the present invention changes the prices according to time zones. By this method, by reducing charges only in idle time zones, the use of contents can be promoted.

The contents delivery method of the present invention is characterized in that: the relay servers respectively group one or more relay servers to plural relay server groups; each of the relay server groups is disposed between the archive server and the user terminals so that the user terminals can directly access relay servers within each of the relay server groups; a number of relay servers within the relay server group increases successively toward a downstream side in which the user terminals are disposed; more contents having high viewing results are accommodated in relay servers in the downstream side; and contents most likely to be viewed are accommodated in the user terminals. By this method, contents for the relay servers can be optimally relocated, and contents can be more flexibly delivered.

The present invention is a contents delivery system sending and receiving data through transmission lines, wherein a data delivery device of the contents delivery system comprises: a center server controlling management information of the whole system; an archive server storing contents for offering service; and edge servers for dispersively processing accesses to contents from contents users, wherein the center server comprises: a contents automatic allocation control part that analyzes a situation of access to contents from the contents users, and directs the archive server or edge servers to allocate contents according to a result of analyzing the situation of access to the contents; and a portal data management part that creates and manages portal data for guiding the contents users according to the result of analyzing the situation of access to the contents, wherein receiving terminals of the contents delivery system have a portal service presenting part that uses the portal data received from the data delivery device to visually show existence of contents to the contents users. With this construction, contents in each of the archive server and the edge servers can be dynamically and optimally relocated, and the maintenance of service quality and the efficient operation of the system can be achieved.

The present invention is the contents delivery system sending and receiving data through transmission lines, wherein the center server includes a contract data management part for managing contract data about contracts with the contents users to view contents. With this construction, a trend of users can be recognized.

The present invention is the contents delivery system sending and receiving data through transmission lines, wherein the center server includes a contents use frequency data creation part that checks use frequencies of individual contents and creates contents use frequency data by analyzing the contract data. With this construction, a viewing tendency of users can be recognized.

The present invention is the contents delivery system sending and receiving data through transmission lines, wherein the contract data management part of the center server performs discount processing for individual contents according to the result of analyzing the situation of access to the contents. With this construction, the use of contents by the users can be promoted.

The present invention is the contents delivery system sending and receiving data through transmission lines, wherein the contents automatic allocation control part of the center server directs the archive server or edge servers to allocate contents according to quality of contents provided to the contents users. With this construction, contents can be dynamically and optimally allocated to the archive server and the edge server.

The present invention is a contents delivery system sending and receiving data through transmission lines, wherein a data delivery device of the contents delivery system comprises: a center server controlling management information of the whole system; an archive server storing contents for offering service; and edge servers for dispersively processing accesses to contents from contents users, wherein the center server comprises: a contents automatic allocation control part that analyzes a situation of access to contents from the contents users, and directs the archive server or edge servers to allocate contents according to a result of analyzing the situation of access to the contents; and a portal data management part that creates and manages portal data for guiding the contents users according to the result of analyzing the situation of access to the contents. With this construction, contents in each of the archive server and the edge servers can be dynamically and optimally relocated, and the maintenance of service quality and the efficient operation of the system can be achieved.

The present invention is the contents delivery system sending and receiving data through transmission lines, wherein the center server includes a contract data management part that performs processing for contracts with the contents users to view contents, and manages contract data. With this construction, a trend of users can be recognized.

The present invention is the contents delivery system sending and receiving data through transmission lines, wherein the center server includes a contents use frequency data creation part that checks use frequencies of individual contents and creates contents use frequency data by analyzing the contract data. With this construction, a viewing tendency of users can be recognized.

The present invention is the contents delivery system sending and receiving data through transmission lines, wherein the contract data management part of the center server performs discount processing for individual contents according to the result of analyzing the situation of access to the contents. With this construction, the use of contents by the users can be promoted.

The present invention is the contents delivery system sending and receiving data through transmission lines, wherein the contents automatic allocation control part of the center server directs the archive server or edge servers to allocate contents according to quality of contents provided to the contents users. With this construction, contents can be dynamically and optimally allocated to the archive server and the edge server.

The present invention is the contents delivery system sending and receiving data through transmission lines, wherein receiving terminals of the contents delivery system have a portal service presenting part that uses portal data for guiding the contents users to visually show existence of contents to the contents users. With this construction, contents available to the users can be shown, so that the use of the contents by the users can be promoted.

The present invention is a contents delivery method for sending and receiving data through transmission lines, wherein a data delivery device of the contents delivery method includes the steps of: controlling management information of the whole system; storing contents for offering service; dispersively processing accesses to contents from contents users; analyzing a situation of access to contents from the contents users; directing allocation of contents according to a result of analyzing the situation of access to the contents; and creating and managing portal data for guiding the contents users according to the result of analyzing the situation of access to the contents. By this method, contents in each of the archive server and the edge servers can be dynamically and optimally relocated, and the maintenance of service quality and the efficient operation of the system can be achieved.

The present invention is a contents delivery method for sending and receiving data through transmission lines, wherein receiving terminals in the contents delivery method include the step of using portal data for guiding the contents users to visually show the existence of contents to the contents users. By this method, the use of the contents by the users can be promoted.

The present invention is recording media recording a contents delivery program for sending and receiving data through transmission lines, wherein the contents delivery program of a data delivery device in a contents delivery system includes the steps of: controlling management information of the whole system; storing contents for offering service; dispersively processing accesses to contents from contents users; analyzing a situation of access to contents from the contents users; directing the allocation of contents according to a result of analyzing the situation of access to the contents; and creating and managing portal data for guiding the contents users according to the result of analyzing the situation of access to the contents. By use of the recording media, contents in each of the archive server and the edge servers can be dynamically and optimally relocated, and the maintenance of service quality and the efficient operation of the system can be achieved.

The present invention is recording media recording a contents delivery program for sending and receiving data through transmission lines, wherein the contents delivery program of receiving terminals in a contents delivery system includes the step of using portal data for guiding the contents users to visually show existence of contents to the contents users. By use of the recording media, the use of the contents by the users can be promoted.

The present invention is a contents delivery program for sending and receiving data through transmission lines, wherein the contents delivery program of a data delivery device in a contents delivery system includes the steps of: controlling management information of the whole system; storing contents for offering service; dispersively processing accesses to contents from contents users; analyzing a situation of access to contents from the contents users; directing allocation of contents according to a result of analyzing the situation of access to the contents; and creating and managing portal data for guiding the contents users according to the result of analyzing the situation of access to the contents. By the delivery program, contents in each of the archive server and the edge servers can be dynamically and optimally relocated, and the maintenance of service quality and the efficient operation of the system can be achieved.

The present invention is a contents delivery program for sending and receiving data through transmission lines, wherein the contents delivery program of receiving terminals in a contents delivery system includes the step of using portal data for guiding contents users to visually show existence of contents to the contents users. By the contents delivery system, the use of the contents by the users can be promoted.

As has been described above, the present invention is a contents delivery system in which a contents delivery network having plural relay servers intervenes between a center device managing an archive server storing contents and user terminals having large-capacity storage devices, and a contents delivery method in the contents delivery system, wherein the center device collects viewing results from the user terminals, analyzes a viewing tendency from the collected viewing results, and relocates, based on the analyzed viewing tendency, contents to each of the archive server, the relay servers, and the storage devices. By this method, contents in each of the archive server, the relay servers, and the terminal storage devices can be dynamically relocated, and the maintenance of service quality and the efficient operation of the system can be achieved. Since users' preferences in relay servers in each region rather than general and average users' preferences can be reflected, contents can be delivered with local colors in mind.

In a contents delivery device and a contents delivery method of the present invention, a contents delivery system comprises a data delivery device and receiving terminal, wherein the data delivery device comprises: a center server controlling management information of the whole system; an archive server storing contents for offering service; and edge servers for dispersively processing accesses to contents from contents users, dispersively stores contents in the archive server and edge server, analyzes the situation of access to contents from contents users, and relocates contents in the archive server and the edge server. By this method, contents can be dynamically and optimally relocated in the archive server and edge server, and the maintenance of service quality and the efficient operation of the system can be achieved, so that investments costs can be reduced.

The objects and advantages of the present invention will be made more apparent by embodiments described below with reference to the accompanying drawings.

BRIEF DESCRIPTION OF THE DRAWINGS

FIG. 1 is a schematic block diagram showing the configuration of a contents delivery system in a first embodiment of the present invention;

FIG. 2 is a schematic block diagram showing an overall flow of the contents delivery system in the first embodiment of the present invention;

FIG. 3 is a schematic block diagram showing another example of an overall flow of the contents delivery system in the first embodiment of the present invention;

FIG. 4 is a data configuration diagram showing the contents of contents attribute data recorded in a contents management table in the first embodiment of the present invention;

FIG. 5A is a data configuration diagram showing the contents of a server storage level management table for URIs in the first embodiment of the present invention;

FIG. 5B is a data configuration diagram showing a table of shelf dropout threshold values and price reduction threshold values classified by storage level in the first embodiment of the present invention;

FIG. 6A is a data configuration diagram showing a terminal setting management table in the first embodiment of the present invention;

FIG. 6B is a data configuration diagram showing viewing history management data in user terminals in the first embodiment of the present invention;

FIG. 11 is a schematic diagram showing a portal screen of a user terminal in the first embodiment of the present invention;

FIG. 14 is a schematic diagram showing another portal screen of a user terminal in the first embodiment of the present invention;

DESCRIPTION OF THE PREFERRED EMBODIMENTS

Figure 7:
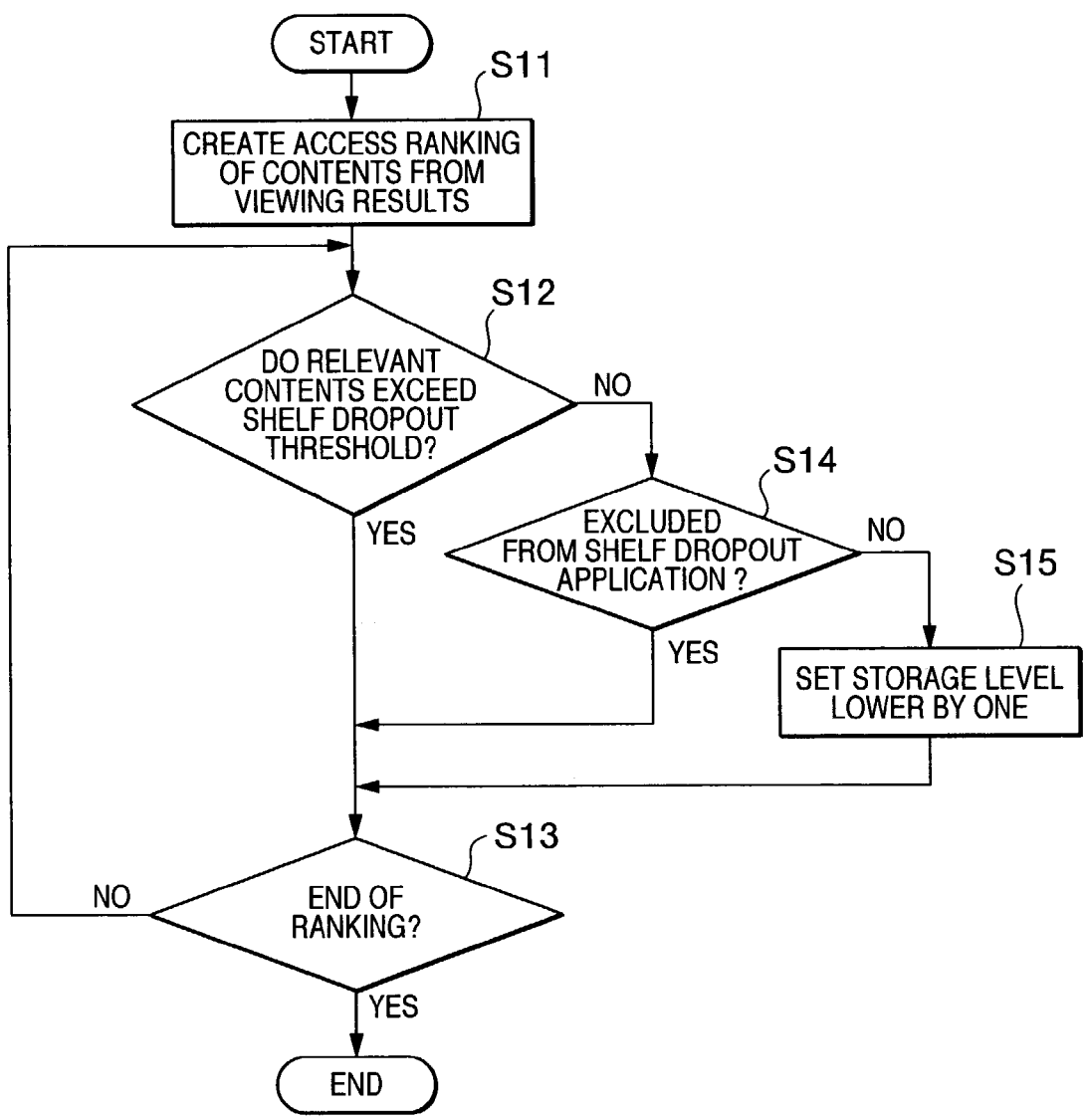
FIG. 7 is a flowchart showing contents relocation processing in user terminals in the first embodiment of the present invention.

Hereinafter, embodiments of the present invention will be described with reference to the drawings.

First Embodiment

FIG. 1 shows an overall configuration of a contents delivery system in a first embodiment of the present invention. In FIG. 1, a center device 1, in addition to basic computer functions, has a viewing results collection part 2, a viewing results analysis part 3, a contents allocation control part 4, a portal creation part 5, a price decision part 6, and a content delivery management part 7, which are connected with each other through a bus 8. The contents allocation control part 4 is connected with an archive server 9 through a network. The archive server 9 is connected with a contents delivery network CDN 10 through the network. An edge server 11 installed for each area of the CDN 10 is connected with user terminals 12 through ADSL, cable television line, or the like. The user terminals 12 each has a terminal 13 and a hard disk drive 14, wherein the terminal 13 is connected with an edge server 11 installed in a corresponding area. On the other hand, the archive server 9 is connected with a broadcasting device 15, which is wirelessly connected with the user terminals 12 through an artificial satellite 16. The center device 1 is directly connected with the user terminals 12 through the Internet 17.

The user terminals 12 can automatically store contents in the hard disk drives 14 from the archive server 9 through the artificial satellite 16 or Internet 17. In this case, the user must make a contract with an administrator (or manager of enterprise) of the center device 1 for viewing. A form of the contract is basically the same for all terminals in that charges are paid for viewing; in this case, the center device delivers contents most likely to be viewed to the user. As another form, contents of a user-specified jenre are delivered and the user pays charges for each of delivered contents. The center device 1 delivers contents to the user terminals 12 periodically or for each new release through the artificial satellite 16 or the Internet 17 and automatically stores or updates them in the hard disk drives 14. According to the automatic storage and updating, the user can automatically collect contents having high viewing results without performing special operations. In the case where the user terminals 12 are delivered with contents from the edge servers 11 of CDN 10, if an administrator of the CDN 10 is the same as the administrator of the center device 1, the user must make a contract with an administrator of the center device 1 for viewing. If the administrator of the CDN 10 is different from the administrator of the center device 1, the user must make a contract with both of them for viewing.

The content delivery management part 7 of the center device 1 manages numerous contents within the archive server 9, region-conscious contents having high viewing results within the edge servers 11, and contents most likely to be viewed within the hard disk drives 14 in the user terminals 12. Contents stored within the archive server 9 are catalog contents viewed by a small number of users; individual contents are infrequently viewed but accesses to the category are many in total. Contents stored in the edge servers 11 are popular contents accessed by comparatively many users. Contents stored in the hard disk drives 14 of the user terminals 12 are very popular contents on which access is expected to concentrate at the first rental release.

A description will be made of an overall flow of the contents delivery system in the first embodiment with reference to FIG. 2. The center device 1 obtains a user's desired genre according to a viewing contract with the user, initially allocates selected contents to the user terminal 12 of the user, the edge servers 11 in a region in which the user resides, and the archive server 9, and creates a portal (step S1). Alternatively, contents may be allocated with the same contents across the country. Next, a trial is made with the contents allocation for a given period of time to obtain viewing results, that is, collect use frequencies by the viewing results collection part 2 during the period of the trial (step S2). The collected viewing results are ranked after being analyzed as to user's age, sex, occupation, residence region, use frequency, and the like by the viewing results analysis part 3 (step S3). Next, an examination is made of contents relocation from the obtained analysis result (step S4). Contents expected to probably become popular may fall short of their expectation, while contents without expectation may become popular. In this case, the contents may be relocated by residence region or network infrastructure taking partial infrastructures among residence regions into account. Network infrastructures do not always depend on regions; for example, a distance between Tokyo and Osaka may be shorter in terms of network than a distance between Tokyo and Sizuoka. If new contents have been already registered at that time, the new contents are taken into account (step S9). At termination of the examination, the portal creation part 5 creates a portal, based on the result of the examination (step S5). The portal is a title screen that indicates what contents can be viewed, and involves portal editing operations (step S10). The price decision part 6 makes an examination of the price of the contents to be used, revises it if necessary, and reflects the result in the portal (step S6). Therefore, the order of steps S6 and S5 may be reverse as shown in FIG. 3. The purchase of service is a tradeoff with costs as in the purchase of products; too costly products will not be used. Accordingly, contents infrequently used are reduced in price to promote the use of them. Also, as a time service, their prices are reduced only in time zones in which they are infrequently used, to promote the use of them. After contents allocation, portal creation, and price decision are thus performed, the contents allocation control part 4 relocates contents to the archive server 9, the edge servers 11, and the user terminals 12 (step S7), releases the created portal, and executes the service (step S8). The result of the service execution is sent as data from the user terminals 12 to the content delivery management part 7 through the Internet 17 of the center device 1, and viewing results are collected in the viewing results collection part 2 and analyzed in the viewing results analysis part 3. The above-described steps are repeated.

Next, a detailed description will be made of contents relocation processing in the center device 1. Optimum contents relocation, which is performed periodically, say every day or every week, is performed from the user terminals 12, wherein the archive server 9 is upstream and the user terminals 12 are downstream. Contents are relocated using the concept of "shelf dropout" and "shelf keeping". The term "shelf dropout" means relocation from downstream terminals or servers to upstream servers; basically, identical contents are allocated to servers of identical storage levels. The term "shelf keeping" means relocation from upstream servers to downstream servers or terminals. To perform "shelf dropout" and "shelf keeping", use frequencies for the contents are used as a parameter so that values less than a given shelf dropout threshold value are defined as "shelf dropout" and values beyond the threshold value are defined as "shelf keeping". Contents likely to depend on current factors, e.g., contents expected to become popular in association with planned promotion of related products from a next week are distargeted for "shelf dropout" at the time of periodical optimum allocation. This setting is manually flagged as "exclusion from application of shelf dropout". Based on users' viewing results, use frequencies for contents are used as a parameter so that price revision is made if a given price reduction threshold value is not satisfied.

FIG. 4 shows the contents of contents attribute data recorded in a contents management table for managing contents in the content delivery management part 7 of the center device 1. The following data are recorded: management ID, title, running time, genre, summary, performers, viewing limitation level (R-rated, etc.), storage level, URL, data storage location within server, encode, price, attribute, valid period, display location within the portal, access ranking, access count, and the like. FIG. 5A is a data configuration diagram showing the contents of a server storage level management table for URIs; a storage level 0 targets the archive server 9, a storage level 1 targets five edge servers of edge server group 1, and a storage level 2 targets 100 edge servers of edge server group 2. In the case where the edge servers 11 consist of one stage as shown in FIG. 1, there are three types of storage levels: "0" of the archive server 9, "1" of the edge servers 11, and "2" of the user terminals 12. FIG. 5B shows a table of shelf dropout threshold values and price reduction threshold values classified by storage level; the shelf dropout threshold values and price reduction threshold values are based on access count, and greater values are set toward a downstream direction so that the user terminals 12 of storage level n+1 are set to the greatest value. FIG. 6A shows a terminal setting management table in which viewing limitation indication, viewing limitation level, viewing limitation cancel password, viewing history display indication, line speed (bps), and the like are defined. FIG. 6B shows the configuration of viewing history management data in the user terminals 12 which consists of management ID, title, view date, URL (indicates what file (contents) was actually viewed), and other data.

Contents relocation processing in the center device 1 begins with the content delivery management part 7 checking contents stored in the user terminals 12, edge servers 11, and archive server 9. That is, the processing is performed toward upstream from downstream. FIG. 7 shows the checking of contents stored in the user terminals 12. In FIG. 7, an access ranking of contents is created from collected and analyzed viewing results (step S11). According to the ranking, individual contents are checked to determine whether they exceed shelf dropout threshold values (step S12), and if they exceed the threshold values, the storage state is kept intact; this processing is performed for all stored contents (step S13). Otherwise, if the contents are excluded from application of shelf dropout, they are kept stored intact (step S14). If the contents are not excluded from application of shelf dropout, the storage level of the contents is set to one lower level, which is the storage level of the edge servers 11 (step S15).

Figure 8:
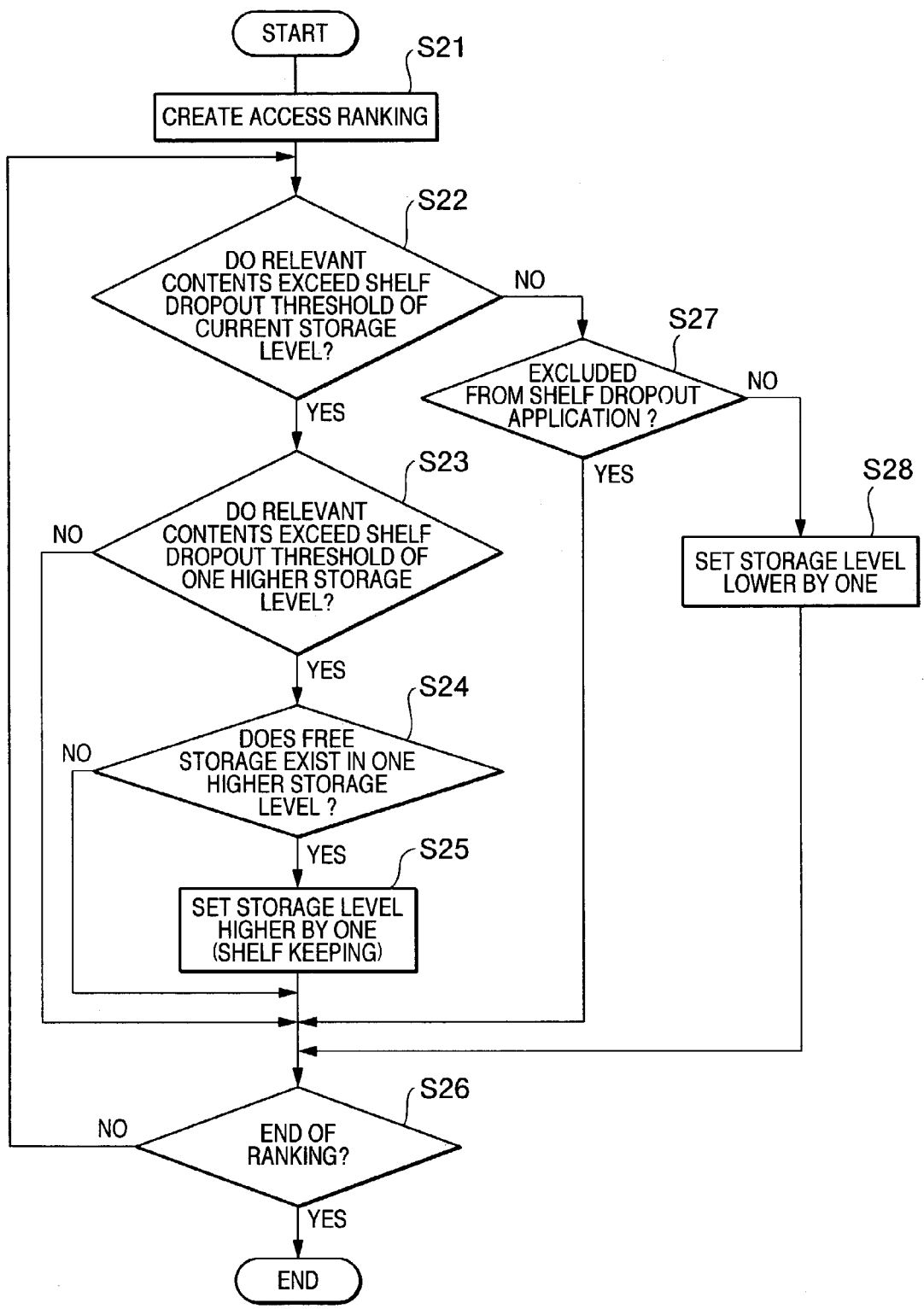
FIG. 8 is a flowchart showing contents relocation processing in edge servers in the first embodiment of the present invention.

FIG. 8 shows the checking of stored contents in the edge servers 11. In FIG. 8, after an access ranking is created (step S21), individual contents stored in the edge servers 11 are checked to determine whether they exceed shelf dropout threshold values at a current storage level (step S22), and if so, the contents are checked to determine whether they exceed shelf dropout threshold values of the user terminals 12 of one higher storage level (downstream side) (step S23). If so, the user terminals 12 are checked for free storage (or available storage) (step S24), and if free storage exists, the storage level of the contents is set higher by one to perform shelf keeping (step S25). This processing is performed for all contents stored in the edge servers 11 (step S26). In step 21, in the case where the shelf dropout threshold values are not exceeded, if the contents are excluded from application of shelf dropout, they are kept stored intact (step S27). If the contents are not excluded from application of shelf dropout, the storage level of the contents is set to one lower level (upstream side), which is the storage level of the archive server 9 (step S28).

Figure 9:
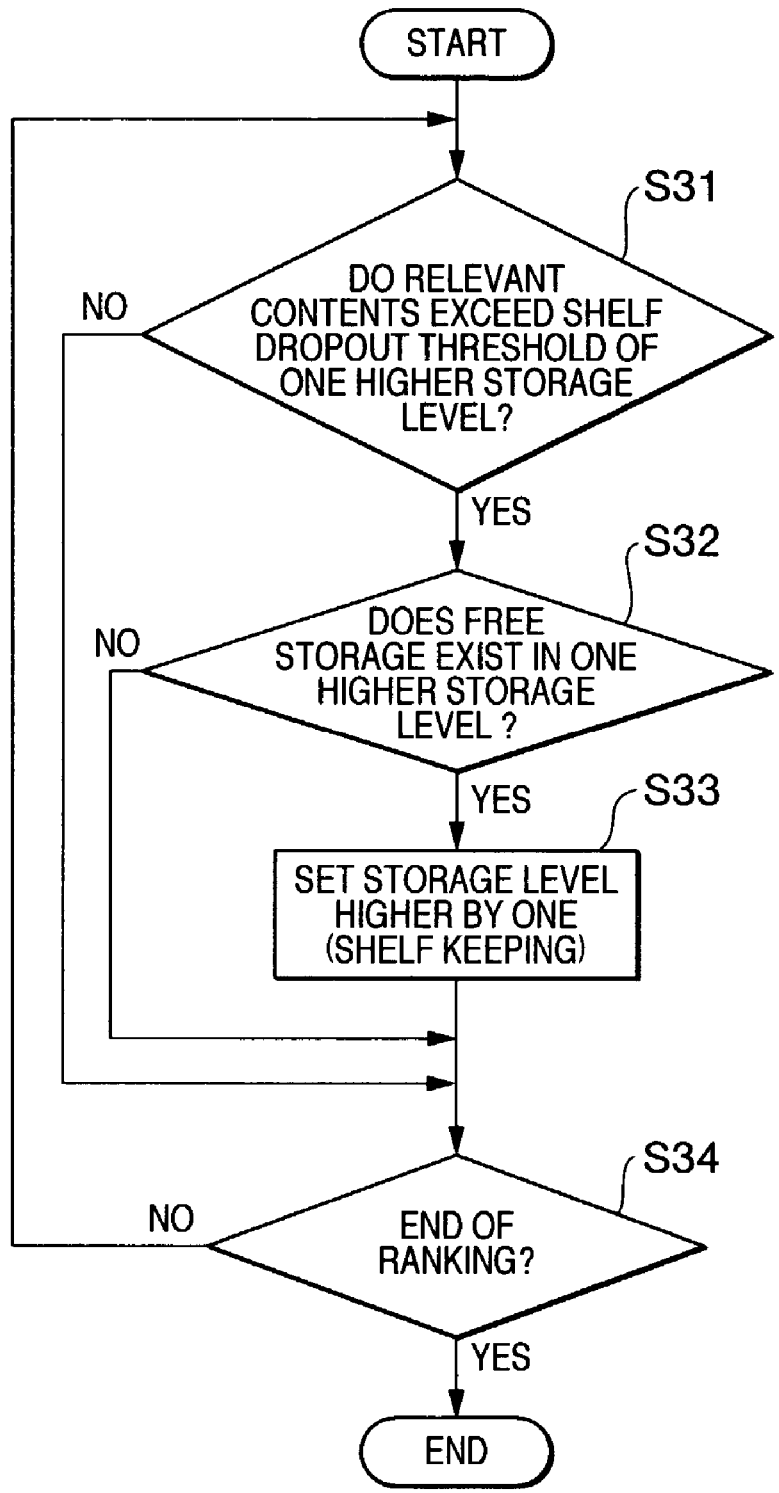
FIG. 9 is a flowchart showing contents relocation processing in archive servers in the first embodiment of the present invention.

FIG. 9 shows storage contents check processing in the archive server 9. In FIG. 9, individual contents stored in the archive server 9 are checked to determine whether they exceed shelf dropout threshold values of the edger server 11 of one higher level (downstream side) (step S31). If so, the edge servers 11 is checked for free storage (step S32), and if free storage exists, the contents are transferred to the edge servers 11, that is, to perform shelf keeping (step S33). This processing is performed for all contents stored in the archive server 9 (step S34). Thus, in the archive server 9, only shelf keeping is taken into account because shelf dropout does not occur. Conversely, if downstream edge servers 11 and user terminals 12 have free storage, even if threshold values are not exceeded, shelf keeping may be performed to effectively use shelves.

In this way, storage contents check processing in the user terminals 12, edge servers 11, and archive server 9 is performed in the contents delivery management part 7, shelf dropout or shelf keeping is performed based on shelf dropout threshold values, and then the contents allocation control part 4 relocates the contents according to storage levels set in the contents management table, so that contents in the user terminals 12, edge servers 11, and archive server 9 are optimally allocated.

Next, a detailed description will be made of automatic creation of contents in the portal creation part 5 of the center device 1 and price decision processing in the price decision part 6. In the case where contents have been relocated, portal contents must be created to reflect the relocated contents. In this case, the contents are allocated so that the users are easily accessible to or prompted to access the contents stored in the user terminals 12 and the edge servers 11. The contents management table is provided with portal display location data indicating a display location within the portal, as shown in FIG. 4, and the portal is automatically created based on the data. The portal display location data contains a rank; for a higher rank, the contents are displayed in a more conspicuous place so that all contents are placed in descending order of rank. The portal display location data may be automatically created from an access ranking or intentionally created with some intention of the administrator.

When a portal is created, contents prices are revised if given price reduction threshold values are not satisfied. For example, prices are reduced for contents that are not subject to shelf dropout but are infrequently accessed. By monitoring or statistically analyzing the situation of access to the edge servers 11, dynamic price revisions such as discounting in idle time zones may be made. If a price has been reduced, the attribute of price reduction is set in the contents management table of the contents delivery management part 7. This makes it possible to recognize a relationship between contents price revisions and viewing results.

Figure 10:
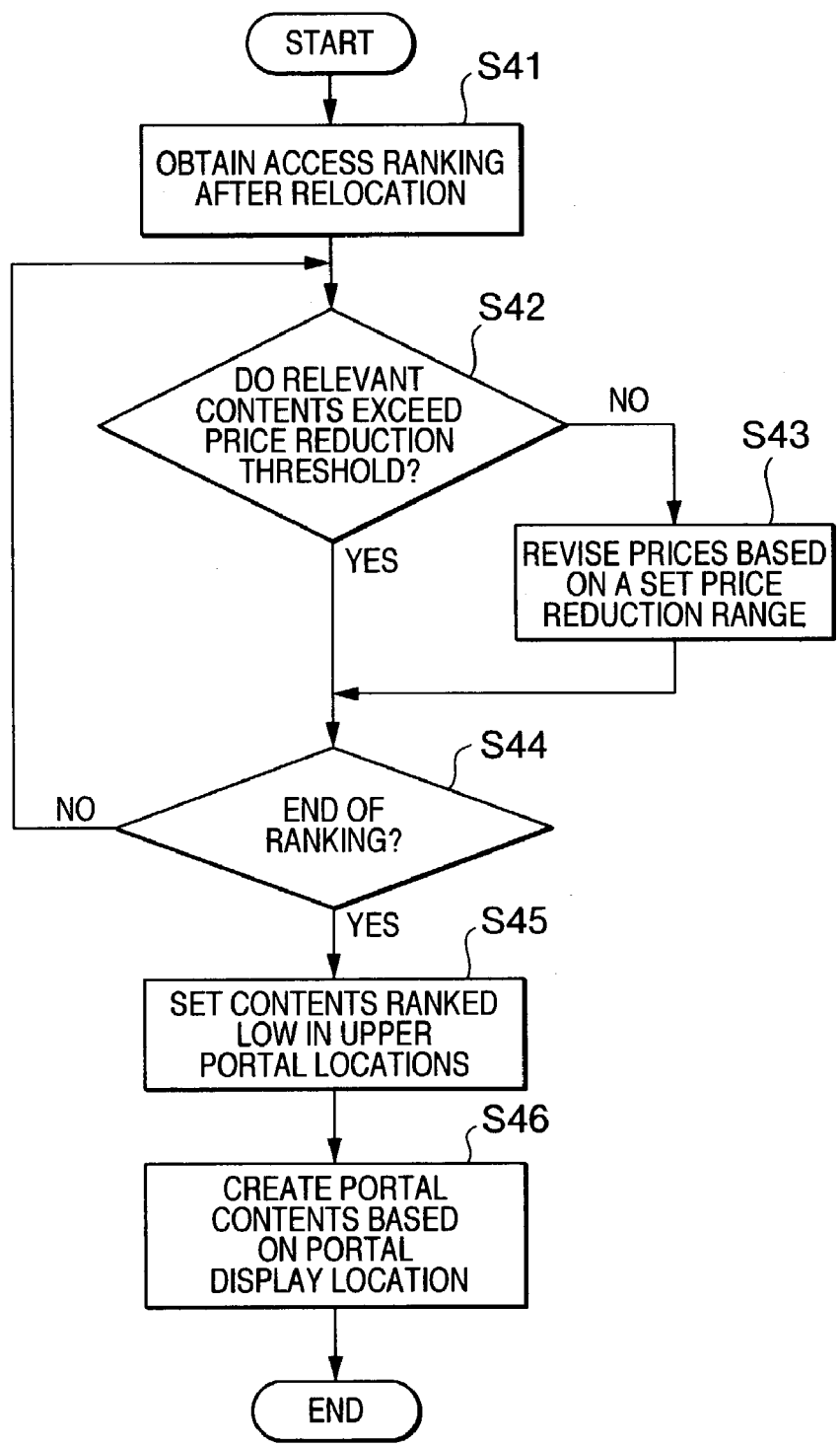
FIG. 10 is a flowchart showing portal automatic creation processing in the first embodiment of the present invention.

FIG. 10 shows portal automatic creation processing in the portal creation part 5. In FIG. 10, an access ranking after execution of relocation is obtained from the contents allocation control part 4 (step S41), and a ranking table is consulted to determine whether individual contents exceed price reduction threshold values (step S42). If so, the prices are kept intact, and if they do not exceed, the prices of the contents are revised based on a predetermined reduction range (step S43), and this processing is performed for all contents (step S44). If necessary, the portal display location data is changed to place contents ranked low in higher positions (step S45). A portal is automatically created based on portal display location data appended to individual contents (step S46). This processing is performed beginning with contents stored in the downstream user terminals 12, then for contents stored in the edge servers 11. Since the archive server 9 stores all other contents not stored in the user terminals 12 and the edge servers 11, the contents are offered by having the users perform a search based on contents attributes and the like.

The edge servers 11 are dispersively disposed, e.g., on a region basis, and portal contents are created to allow the users to automatically access an optimum server when they access contents. FIG. 11 shows a portal screen displayed in the user terminals 12, which displays additional information 21, title 22, running time 23, service type 24, button 25 for viewing details, and button 26 for viewing contents. The user terminals 12 obtain portal contents having identical contents from the center device 1 (except links to the contents) but have different display contents, depending on the state and settings of the terminals. The portal contents contain, in addition to information (title, time, etc.) actually displayed, contents attribute data shown in FIG. 4 as meta-information of the contents themselves (information about the contents themselves, and attribute information). Portal contents delivered from the center device 1 to the user terminals 12 are offered through the Internet 17 or directly delivered in the hard disk drives 14 of the user terminals 12 over broadcasting from the artificial satellite 16. In the case of the former, since the portal is dynamically changed because the Internet is used, contents not stored are also included. In the case of the latter, since dynamic relocation of contents of the edge servers 11 and the archive server 9 is not supported, only contents to be stored are targeted. Contents not stored are dynamically displayed depending on a contents storage state. For broadcasting storage that is not always perfect for storage, "not stored" or "coming soon" is displayed for contents not stored. In the case where price information displayed in the portal is statically determined, a price display can be changed depending on time by including plural prices and time zones in advance in the portal contents and displaying prices corresponding to a current time at the time of displaying to the user terminals 12. At that time, time sale marks are also displayed to enable application to time-fixed time services.

For the additional information 21 of FIG. 11, attention marks are mainly used to attract users' attention. The attention marks are provided by the user terminals 12 from contents attribute data or in advance attached to the portal contents sent from the center device 1. "New" is attached to products newly released that are within a given period after the start of a contents valid period, e.g., two months after the contents become viewable. "Recommend" are attached to recommendable products. "Discount" is attached to products reduced in price. "Time Sale" is attached to products targeted for time sale. "Soon closed" is attached to products soon closed that are within a given period before the end of a contents valid period, e.g., one week before contents viewing end. Title 22 indicates contents arranged in descending order of popularity. Service type 24 indicates contents storage locations. "HDD" indicates the hard disk drive 14 of the user terminals 12. "Stream" indicates that streaming from the edge servers 11 is possible. "Download" indicates that downloading from the archive server 9 is possible, displaying download time matching communication environments of individual terminals (described later). "R-rated" is not displayed in the portal as a rule; levels set in the user terminals and levels set in individual contents are compared, and whether to make a display is selected in the user terminals.

Figure 12:
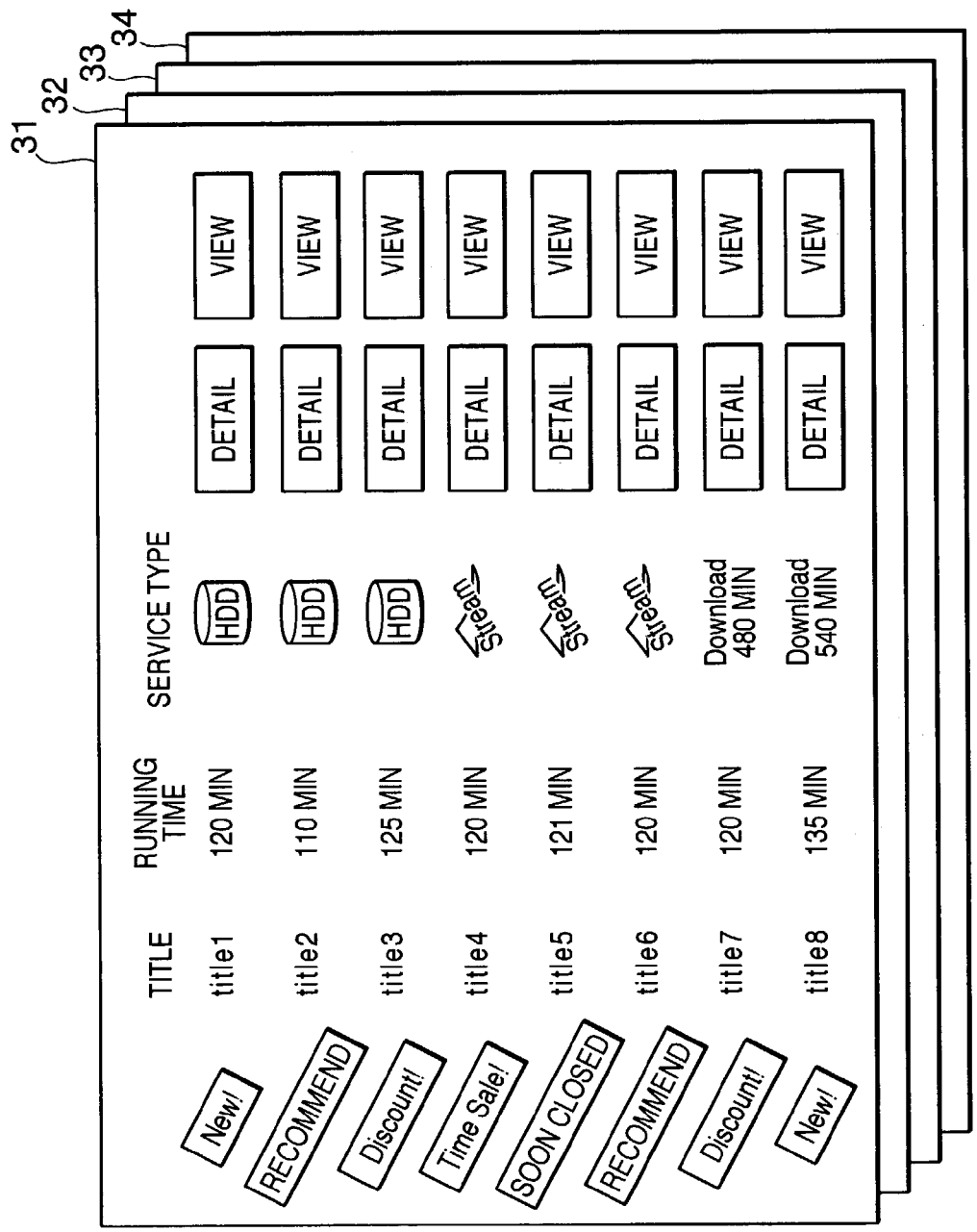
FIG. 12 is a schematic diagram showing another portal screen of a user terminal in the first embodiment of the present invention.
Figure 13:
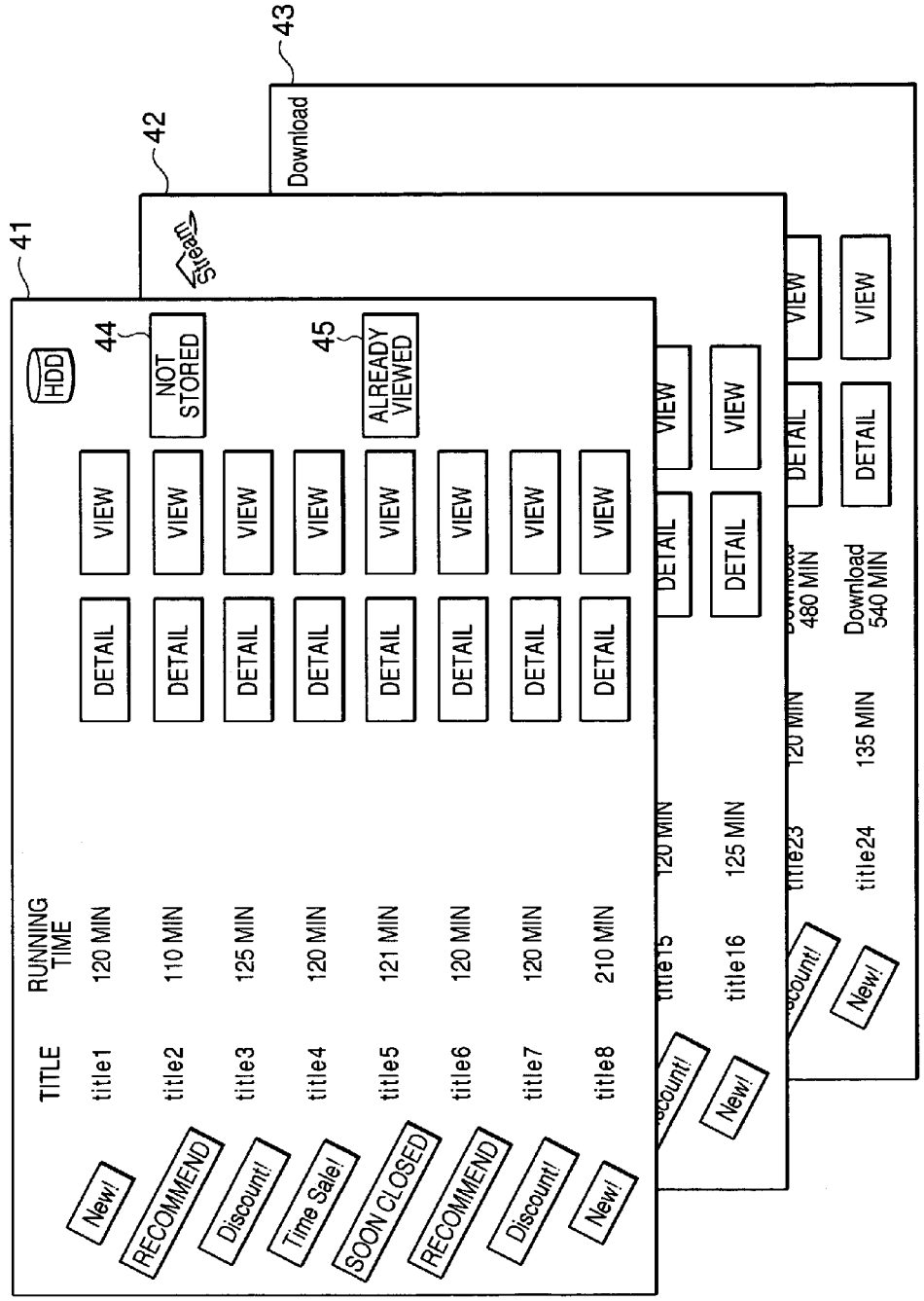
FIG. 13 is a schematic diagram showing another portal screen of a user terminal in the first embodiment of the present invention.

FIG. 12 shows an example of portal contents residing on plural pages 31, 32, 33, and 34. Priorities of portal display location data are higher toward preceding pages, and higher toward upper positions on one page. Contents extending onto plural pages may be divided into "HDD" page 41, "Stream" page 42, and "Download" page 43 by storage location, as shown in FIG. 13. In the figure, "Not stored" mark 44 and "Already viewed" mark 45 are displayed. The "Already viewed" mark 45 may be optionally selected by the users to hold privacy for fear that what was viewed previously is revealed to others.

The center device 1 periodically checks network environments used by the user terminals 12, measures a line speed from previous download results, and sets a line speed item of terminal setting management data shown in FIG. 6A. Based on the information, download time is estimated and displayable contents are selected. Contents which cannot be viewed in the current environment are not displayed. FIG. 14A shows a display example in the user terminals 12 with fast line speeds, and FIG. 14B shows a display example in the user terminals 12 with slow line speeds. In the case of FIG. 14B, "Stream" is erased from the portal screen because stream contents cannot be viewed, and download contents take twice as long to download.

Figure 15:
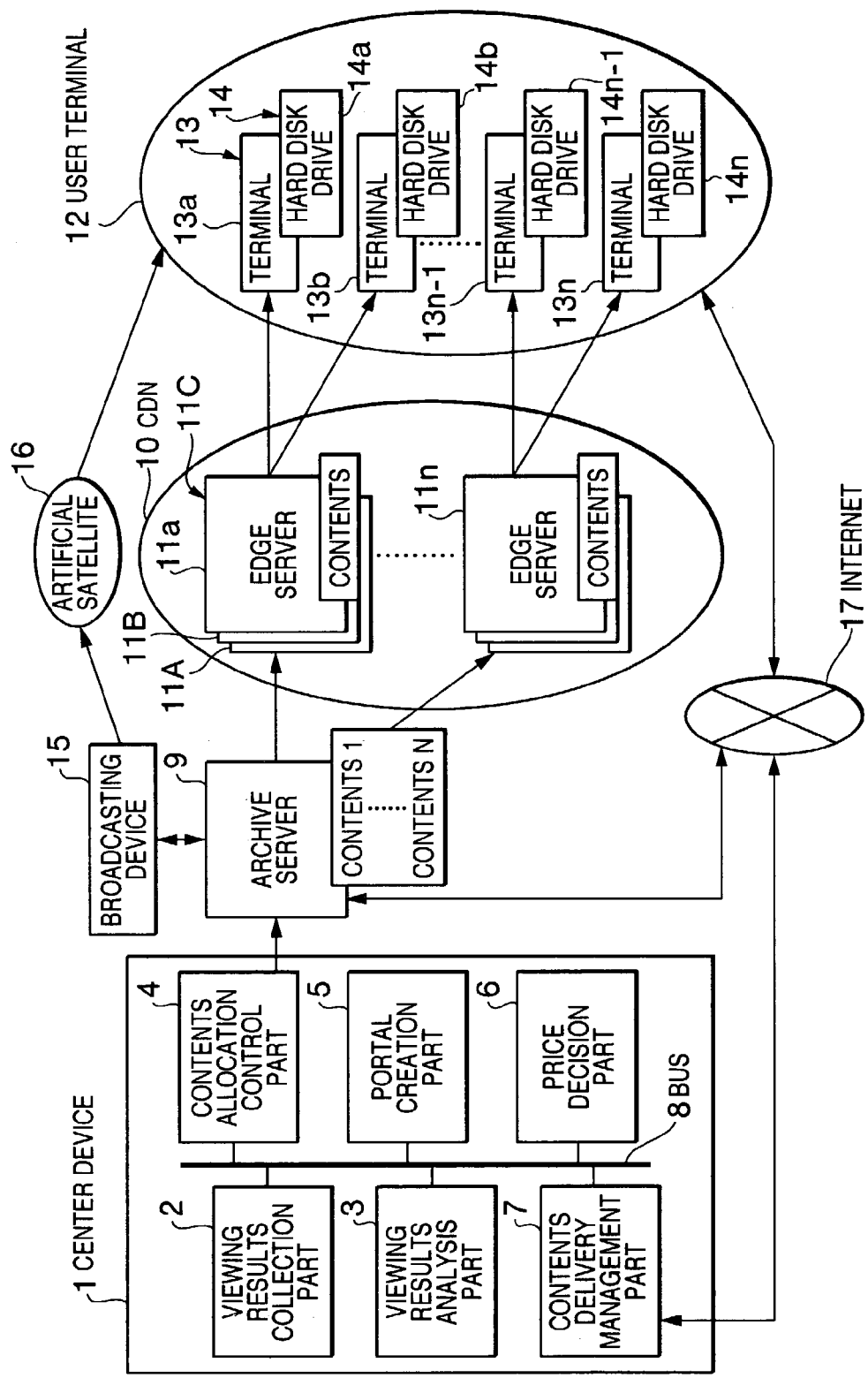
FIG. 15 is a schematic block diagram showing another example of the contents delivery system in the first embodiment of the present invention.
Figure 16:
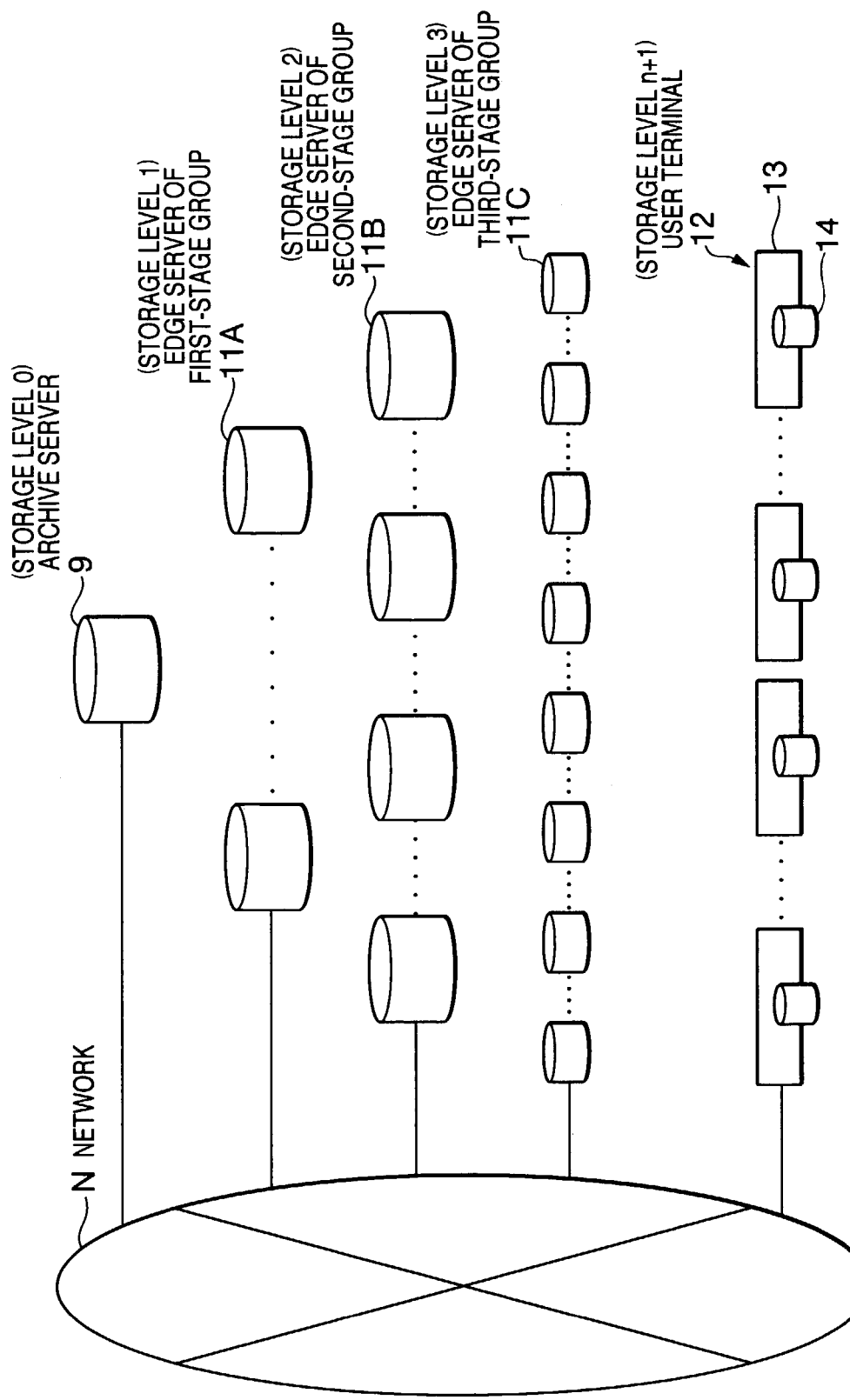
FIG. 16 is a schematic block diagram showing a multi-stage configuration of edge servers in another contents delivery system in the first embodiment of the present invention.

In the contents delivery system as described above, although the edge servers 11 of CDN 10 consist of one stage as shown in FIG. 1, the edge servers 11 may consist of a multistage group such as 11A, 11B, and 11C as shown in FIG. 15. FIG. 16 shows its detailed structure. Logically, downstream of the archive server 9 is disposed an edge server 11A of first stage group, downstream of the edge server 11A of the first stage group is disposed an edge server 11B of second stage group, downstream of the edge server 11B of the second stage group is disposed an edge server 11C of third stage group, and downstream of the edge server 11C of the third stage group are disposed the user terminals 12, wherein they each are connected to network N so that the user terminals 12 can gain access directly to the edge servers 11A, 11B, and 11C of the groups and the archive server 9 through the network N. The archive server 9 is set to storage level "0", the edge server 11A to storage level "1", the edge server 11B to storage level "2", and the edge server 11C to storage level "3"; they match the contents of the server storage level management table for URIs shown in FIG. 5A. The edge servers 11 increase in number toward downstream and respond more appropriately to an increase in access to contents toward downstream. Between the user terminals 12 and the edge server 11C, between the edge servers 11C and 11B, between the edge servers 11B and 11A, and between the edge server 11A and the archive server 9, contents can be interchanged by the above-described method. Therefore, in the contents delivery system shown in FIG. 15, since only contents very popular with the users can be accommodated in the edge server 11C closest to the user terminals 12, not only the load on the edge server 11C can be reduced but also contents can be interchanged with the edge server 11B of the next stage immediately according to changes in the popularity of the contents. Consequently, the contents can be flexibly and optimally relocated among the edge servers. Also, a preference tendency of users can be immediately reflected, and local-color-rich and elaborate contents delivery becomes possible. As a result, the user terminals 12 will be stored with only contents most likely to be viewed.

Second Embodiment

Figure 17:
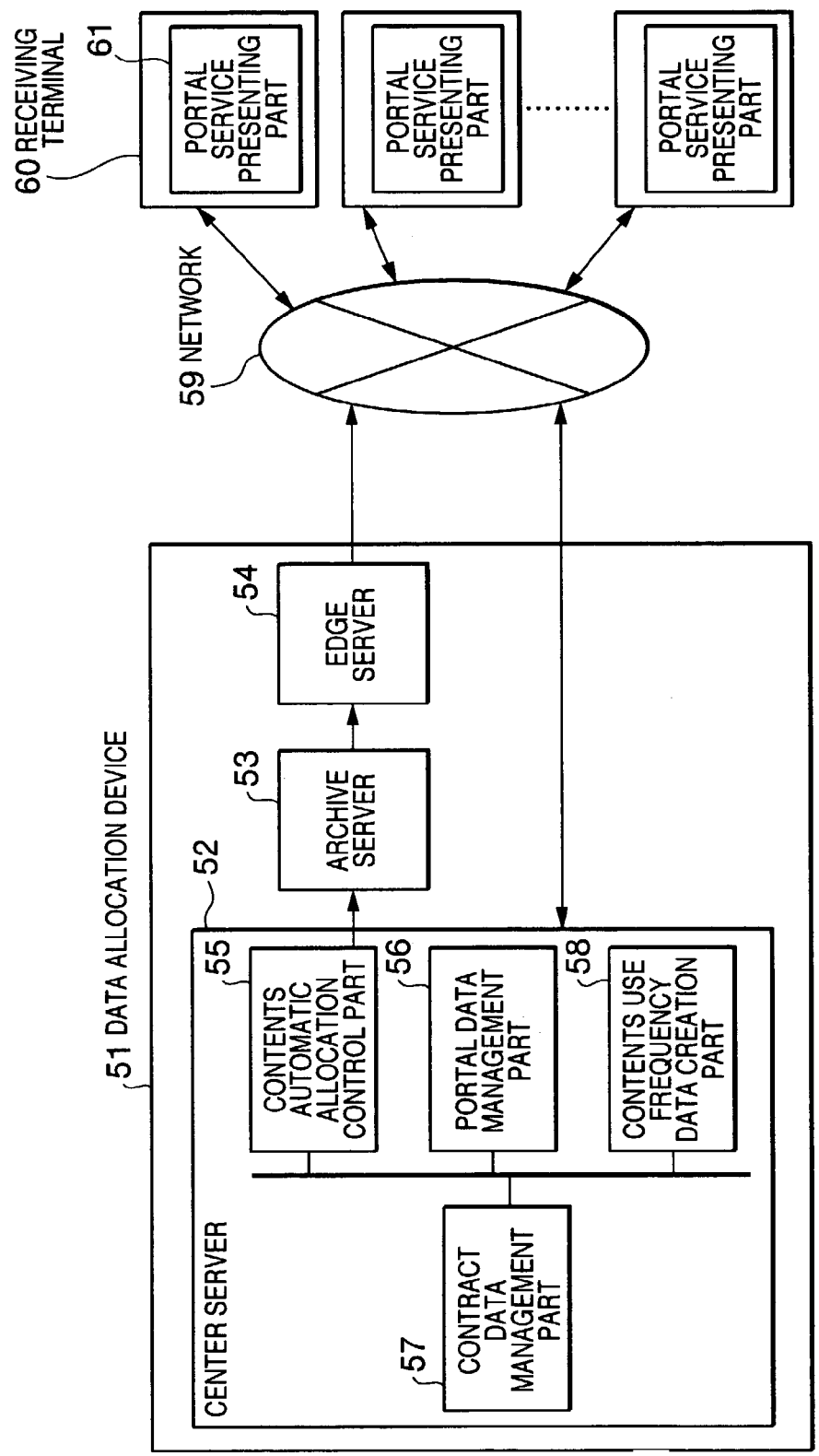
FIG. 17 is a block diagram showing the configuration of a contents delivery system in a second embodiment of the present invention.

Next, a second embodiment of the present invention will be described. The first embodiment is achieved in global and relatively large network systems, while the second embodiment can be achieved even in narrower and smaller network systems. FIG. 17 shows the configuration of a contents delivery system in the second embodiment. A data delivery device 51 is connected to plural receiving terminals 60 through a network 59. The data delivery device 51 has a center server 52 controlling management information of the whole system, an archive server 52 storing contents for offering service, and an edge server 54 for dispersively processing accesses to contents from contents users. The edge server 54 and the center server 52 of the data delivery device 51 each are connected to the network 59, and the center server 52 can send and receive data directly to and from the receiving terminal 60 to receive contract data and viewing data. Plural edge servers may be dispersively disposed as in the first embodiment.

The center server 52 comprises: a contents automatic allocation control part 55 that analyzes the situation of access to contents from contents users, and directs the archive server 53 or edge server 54 to allocate contents according to the result of analyzing the situation of access to the contents; a portal data management part 56 that creates and manages portal data for guiding the contents users according to the result of analyzing the situation of access to the contents; a contract data management part 57 that manages contract data about contracts with the contents users to view contents; and a contents use frequency data creation part 58 that checks the use frequencies of individual contents and creates contents use frequency data by analyzing the contract data. The contents automatic allocation control part 55 directs the archive server 53 or edge server 54 to relocate contents according to the quality or popularity of contents provided to the contents users. The portal data management part 56 guides contents users by arranging contents in the order of popularity or conspicuously arranging emphasized contents according to the result of analyzing the situation of access to the contents. The contract data management part 57 performs discount processing for individual contents according to the result of analyzing the situation of access to contents and promotes the use of emphasized contents and the use of contents in idle time zones. The receiving terminal 60 has a portal service presenting part 61 that uses portal data received from the data delivery device 51 to visually show the existence of contents to contents users.

Figure 18:
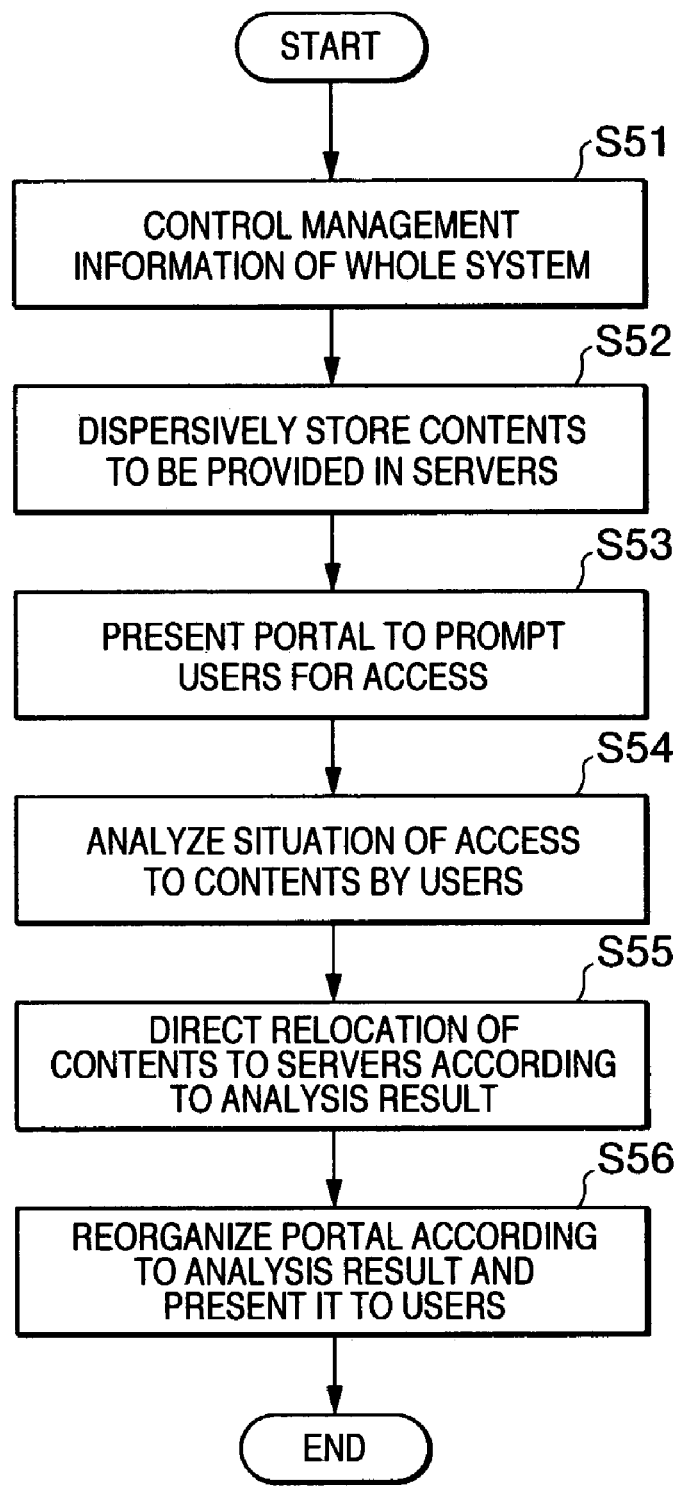
FIG. 18 is a flowchart showing a contents delivery method in the second embodiment of the present invention.

A contents delivery method in the data delivery device 51 in the second embodiment will be described with reference to FIG. 18. An overall flow is the same as in the above-described first embodiment. The center server 52 controls management information of the whole system (step S51) extracts a viewing tendency of users from contract data managed in the contract data management part 57, and dispersively stores the contents to be provided in the archive server 53 and edge server 54 (step S52). The center server 52 sends a portal created in the portal data management part 56 to the receiving terminals 60 through the network 59 to prompt the users for access by showing them the portal in the portal service presenting part 61 (step S53) of the receiving terminals 60 (step S53). While contents accesses to the edge server 54 from plural contents users are dispersively processed, the contents use frequency data creation part 58 of the center server 52 analyzes the situation of contents accesses by contents users (step S54), and according to the result of analyzing the contents access situation, the contents automatic allocation control part .55 directs the archive server 53 and edge server 54 to relocate contents (Step S55). The portal data management part 56, according to the result of analyzing the contents access situation, creates new portal data for guiding the contents users and provides it to the receiving terminals 60 of the users again (step S56). By thus performing the same processing as in the first embodiment, contents can be dynamically and optimally relocated in the archive server 53 and edge server 54, and the maintenance of service quality and the efficient operation of the system can be achieved.

In the second embodiment, if the receiving terminals 60 not only perform streaming for contents from the edge server 54 but also are provided with hard disk drives to store contents downloaded from the edge server 54 therein, the users can view the contents at convenient times. There may be provided plural edge servers 54 each of which is connected to the network 59, or the edge server 54 may consists of multiple stages each of which is connected to the network 59, thereby enabling quick response to various requests of contents users.

By creating the method of the present invention as a program usable to computers, contents delivery management can be performed using computers. By recording the program in storage media usable to computers, the computers can be operated through the recording media.

In the above embodiments, the contents delivery system is explained as using an artificial satellite or satellite broadcasting system. However, the contents also can be delivered via any other broadcasting system using for example, usual earthy wave broadcast, CATV, internet broadcast etc.

Although the present invention has been described based on preferred embodiments shown in the drawings, it is apparent that the present invention can be easily changed or modified by those skilled in the art. Such modifications are also included in the scope of the present invention.

What is claimed is:

1. A contents delivery system in which a contents delivery network having plural relay servers intervenes between a center device managing an archive server storing contents and user terminals having large-capacity storage devices, wherein said center device comprises:
   a viewing results collection part for collecting viewing results from said user terminals;
   a viewing results analysis part for analyzing a viewing tendency from said collected viewing results;
   a contents allocation control part for relocating, based on said analyzed viewing tendency, contents to each of said archive server, said relay servers, and said storage devices;
   a contents delivery management part having a contents management table;
   a portal creation part, when said contents have been relocated, for automatically creating portal contents reflecting the relocated contents, and
   a portal display location data for indicating a display location within said portal contents is contained in said contents management table.

2. The contents delivery system according to claim 1, wherein additional information for said contents is appended to said portal contents.

3. The contents delivery system according to claim 2, wherein said additional information is a mark for attracting users' interest.

4. The contents delivery system according to claim 2, wherein said additional information is a viewing end mark capable of selecting whether to make display or not.

5. The contents delivery system according to claim 1, including a price decision part for changing contents prices according to said collected viewing results.

6. The contents delivery system according to claim 5, changing said prices according to time zones.

7. The contents delivery system according to claim 5, wherein, if said prices are changed, the changed prices are recorded in said contents management table.

8. The contents delivery system according to claim 1, wherein said relay servers respectively group one or more relay servers to plural relay server groups; each of said relay server groups is disposed between said archive server and said user terminals so that said user terminals can directly access relay servers within each of said relay server groups; a number of relay servers within said relay server group increases successively toward a downstream side in which said user terminals are disposed; more contents having high viewing results are accommodated in relay servers in said downstream side; and contents most likely to be viewed are accommodated in said user terminals.

9. The contents delivery system according to claim 1, delivering contents from said archive server to said user terminals with automatic storage updating via a satellite.

10. The contents delivery system according to claim 1, delivering contents from said archive server to said user terminals with automatic storage updating via the Internet.

11. A contents delivery method in a contents delivery system in which a contents delivery network having plural relay servers intervenes between a center device managing an archive server storing contents and user terminals having large-capacity storage devices, wherein processing of said center device includes the steps of:
   collecting viewing results from said user terminals;
   analyzing a viewing tendency from said collected viewing results; and
   relocating, based on said analyzed viewing tendency, contents to each of said archive server, said relay servers, and said storage devices;
   automatically creating, when said contents have been relocated, portal contents reflecting the relocated contents; and
   appending portal display location data indicating a display location within said portal contents into said contents management table.

12. The contents delivery method according to claim 11, including the step of changing the contents prices according to said collected viewing results.

13. The contents delivery method according to claim 12, changing said prices according to time zones.

14. The contents delivery method according to claim 11, wherein said relay servers respectively group one or more relay servers to plural relay server groups; each of said relay server groups is disposed between said archive server and said user terminals so that said user terminals can directly access relay servers within each of said relay server groups; a number of relay servers within said relay server group increases successively toward a downstream side in which said user terminals are disposed; more contents having high viewing results are accommodated in relay servers in said downstream side; and contents most likely to be viewed are accommodated in said user terminals.

15. A contents delivery system including a data delivery service for sending contents and receiving terminal for receiving said contents, and sending and receiving data through transmission lines, wherein
said data delivery device of said contents delivery system comprises:
a center server controlling management information of the whole system;
an archive server storing contents for offering service; and
edge servers for dispersively processing accesses to contents from contents users;
said center server comprises:
a contents automatic allocation control part that analyzes a situation of access to contents from said contents users, and directs said archive server or edge servers to allocate contents according to a result of analyzing the situation of access to said contents; and
a portal data management part that creates and manages portal data for guiding said contents users according to the result of analyzing the situation of access to said contents; and
said receiving terminals of said contents delivery system have a portal service presenting part that uses said portal data received from said data delivery device to visually show existence of contents to said contents users;
wherein said portal data management part guides contents users by arranging contents in the order of popularity or conspicuously arranging emphasized contents according to the result of analyzing the situation of access to the contents.

16. The contents delivery system sending and receiving data through transmission lines according to claim 15, wherein said center server includes a contract data management part for managing contract data about contracts with said contents users to view contents.

17. The contents delivery system sending and receiving data through transmission lines according to claim 16, wherein said center server includes a contents use frequency data creation part that checks use frequencies of individual contents and creates contents use frequency data by analyzing said contract data.

18. The contents delivery system sending and receiving data through transmission lines according to claim 16, wherein the contract data management part of said center server performs discount processing for individual contents according to the result of analyzing the situation of access to said contents.

19. The contents delivery system sending and receiving data through transmission lines according to claim 15, wherein the contents automatic allocation control part of said center server directs said archive server or edge servers to allocate contents according to quality of contents provided to said contents users.

20. A contents delivery method for sending and receiving data between a data delivery device and receiving terminal through transmission lines, wherein a data delivery device of said contents delivery method includes the steps of:
controlling management information of the whole system;
storing contents for offering service;
dispersively processing accesses to contents from contents users;
analyzing a situation of access to contents from said contents users;
directing allocation of contents according to a result of analyzing the situation of access to said contents; and
creating and managing portal data for guiding said contents users according to the result of analyzing the situation of access to said contents; and
said receiving terminal in said contents delivery method include the step of using portal data for guiding contents users to visually show existence of contents to said contents users,
wherein said portal data is used for guiding contents users by arranging contents in the order of popularity or conspicuously arranging emphasized contents according to the result of analyzing the situation of access to the contents.

21. Recording media recording a contents delivery proogram for sending and receiving data between a data delivery device and receiving terminal through transmission lines, wherein the contents delivery program of a data delivery device in a contents delivery system includes the steps of:
controlling management information of the whole system;
storing contents for offering service;
dispersively processing accesses to contents from contents users;
analyzing a situation of access to contents from said contents users;
directing allocation of contents according to a result of analyzing the situation of access to said contents; and
creating and managing portal data for guiding said contents users according to the result of analyzing the situation of access to said contents, and
the contents delivery program of said receiving terminal in a contents delivery system include the step of using portal data for guiding contents users to visually show existence of contents to said contents user,
wherein said portal data is used for guiding contents users by arranging contents in the order of popularity or conspicuously arranging emphasized contents according to the result of analyzing the situation of access to the contents.

22. A contents delivery program, executed by a computer, for sending and receiving data between a data delivery device and receiving terminal through transmission lines, wherein the contents delivery program of a data delivery device in a contents delivery system includes the steps of:
controlling management information of the whole system;
storing contents for offering service;
dispersively processing accesses to contents from contents users;
analyzing a situation of access to contents from said contents users;
directing allocation of contents according to a result of analyzing the situation of access to said contents; and
creating and managing portal data for guiding said contents users according to the result of analyzing the situation of access to said contents
the contents delivery program of said receiving terminal in a contents delivery system includes the step of using portal data for guiding contents users to visually show existence of contents to said contents user,
wherein said portal data is used for guiding contents users by arranging contents in the order of popularity or conspicuously arranging emphasized contents according to the result of analyzing the situation of access to the contents.

* * * * *